United States Patent
Isoli

(10) Patent No.: US 10,538,253 B2
(45) Date of Patent: Jan. 21, 2020

(54) CABLEWAY INSTALLATION, METHOD FOR ENHANCING SECURITY OF A CABLEWAY INSTALLATION AND SECURITY SYSTEM FOR A CABLEWAY INSTALLATION

(71) Applicant: EUROTECH S.P.A., Amaro (UD) (IT)

(72) Inventor: Bruno Isoli, Amaro (IT)

(73) Assignee: EUROTECH S.P.A., Amaro (UD) (IT)

( * ) Notice: Subject to any disclaimer, the term of this patent is extended or adjusted under 35 U.S.C. 154(b) by 173 days.

(21) Appl. No.: 15/555,782

(22) PCT Filed: Mar. 3, 2016

(86) PCT No.: PCT/IT2016/000055
§ 371 (c)(1),
(2) Date: Sep. 5, 2017

(87) PCT Pub. No.: WO2016/139692
PCT Pub. Date: Sep. 9, 2016

(65) Prior Publication Data
US 2018/0050706 A1      Feb. 22, 2018

(30) Foreign Application Priority Data
Mar. 5, 2015   (IT) .................. 102015000007635

(51) Int. Cl.
*B61B 12/06*     (2006.01)
*B61B 12/00*     (2006.01)

(52) U.S. Cl.
CPC ............ *B61B 12/06* (2013.01); *B61B 12/002* (2013.01)

(58) Field of Classification Search
CPC ........ B61B 12/06; B61B 12/02; B61B 12/002
See application file for complete search history.

(56) References Cited

U.S. PATENT DOCUMENTS 3,348,499 A * 10/1967 Sowder .................. B61B 12/06
                                                    104/178
4,462,314 A *  7/1984 Kunczynski ............. B61B 7/04
                                                    104/115
(Continued)

FOREIGN PATENT DOCUMENTS

CN         1482031 A      3/2004
EP         2062798 A2     5/2009
(Continued)

OTHER PUBLICATIONS

Italian Patent Office Search Report and Written Opinion dated Nov. 24, 2015 (partially in English).
(Continued)

*Primary Examiner* — Jason C Smith
(74) *Attorney, Agent, or Firm* — Hedman & Costigan, P.C.; James V. Costigan; Kathleen A. Costigan

(57) ABSTRACT

Cableway installation (10), comprising at least a housing (11) suitable to carry passengers and equipped with a safety device (12) which is movable between an access configuration and a safety configuration.
The installation (10) comprises:
  radiation emitting means (13);
  reflecting means (14), adapted to reflect said radiation;
  receiving means (15), adapted to receive a reflection of said radiation emitted by said reflecting means (14).
The emitting means (13), the reflecting means (14) and the receiving means (15) are arranged in such a way that, in at least a predefined operating condition, the emitting means (13) are facing the reflecting means (14), to irradiate them, and the reflecting means (14) are facing the receiving means (15) to reflect the radiation towards them.
The reflecting means (14) are fixed to the safety device (12) so as to reflect the radiation differently depending on
(Continued)

whether the safety device (12) is in the access configuration or in the safety configuration.

11 Claims, 2 Drawing Sheets

(56) References Cited

U.S. PATENT DOCUMENTS

| | | | | |
|---|---|---|---|---|
| 2004/0003751 A1* | 1/2004 | Albrich | ................ | B61B 12/002 104/27 |
| 2008/0282928 A1* | 11/2008 | Flom | .................... | B61B 12/002 104/173.2 |
| 2009/0139427 A1* | 6/2009 | Assmann | ............. | B61B 12/002 105/149.2 |
| 2016/0016594 A1* | 1/2016 | Trantina | ............... | A01K 5/0266 104/112 |
| 2018/0050706 A1* | 2/2018 | Isoli | ........................ | B61B 12/06 |
| 2018/0162417 A1* | 6/2018 | Vichier Guerre | ..... | B61B 12/002 |

FOREIGN PATENT DOCUMENTS

| | | |
|---|---|---|
| EP | 2067682 A1 | 6/2009 |
| EP | 2062798 A3 | 5/2011 |
| EP | 2409888 A1 | 1/2012 |
| FR | 2976542 A1 | 12/2012 |
| WO | 2012/172198 A1 | 12/2012 |
| WO | 2014/140501 A1 | 9/2014 |

OTHER PUBLICATIONS

Notification of Transmittal of the International Search Report and the Written Opinion of the International Searching Authority for PCT/IT2016/000055 dated Jul. 25, 2016.
English Abstract for FR 2976542 A1 dated Dec. 21, 2012.
English Abstract for EP 2409888 A1 dated Jan. 25, 2012.
English Abstract for EP 2062798 A2 dated May 27, 2009.
English Abstract for EP 2062798 A3 dated May 18, 2011.
English Abstract for CN 1482031 A dated Mar. 17, 2004.

* cited by examiner

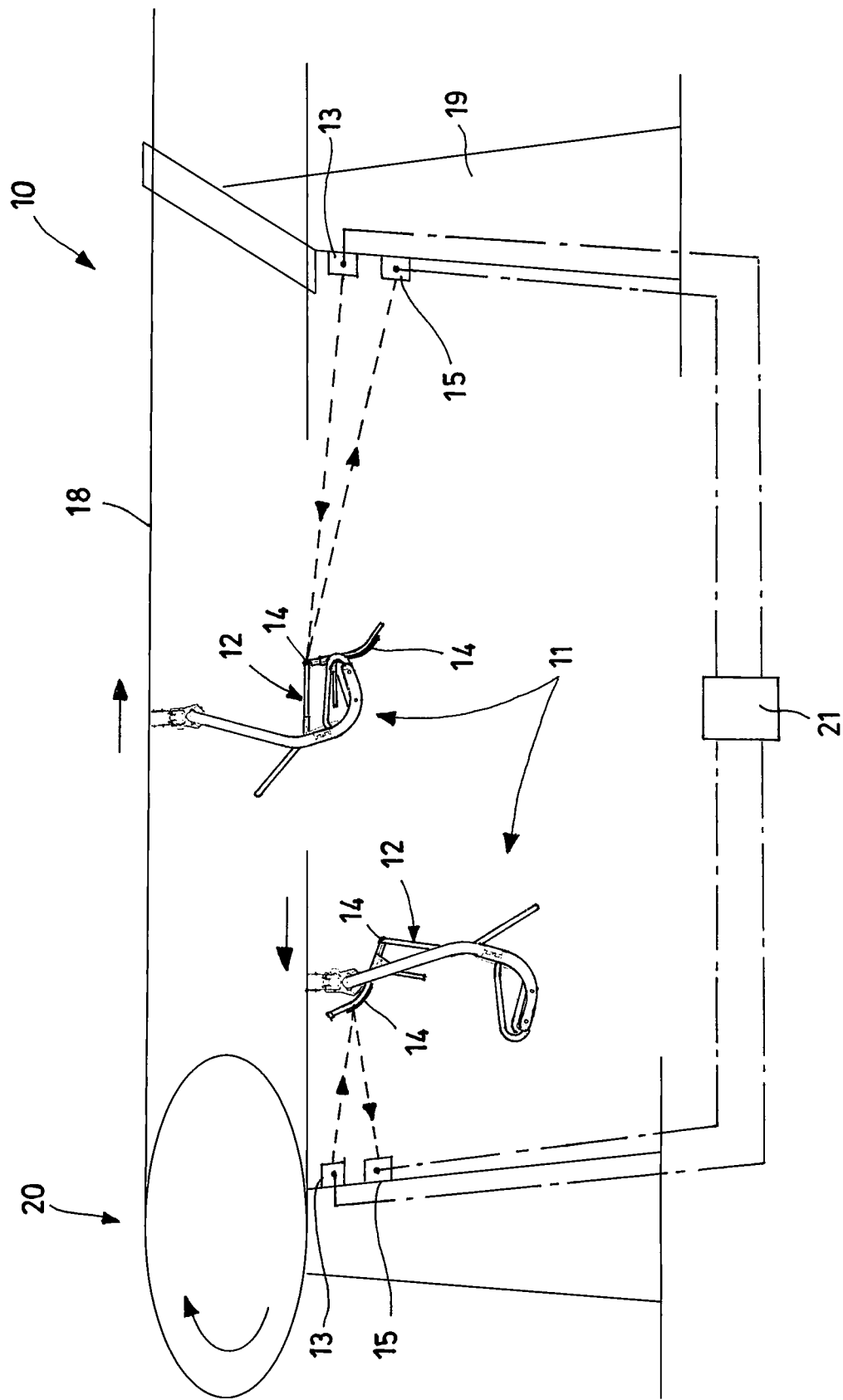

CABLEWAY INSTALLATION, METHOD FOR ENHANCING SECURITY OF A CABLEWAY INSTALLATION AND SECURITY SYSTEM FOR A CABLEWAY INSTALLATION

The present invention relates to cableway installation, a method for enhancing security of a cableway installation and a security system for a cableway installation.

Clearly, the present invention may refer to any type of cableway installation, that, by way of non-exhaustive example, may be a gondola or a chair lift.

Therefore, the present invention is in the field of cableway installations.

Nowadays, are known several security systems for verifying the presence of a passenger on a transport element of a cableway installation and adapted to detect whether the passenger is restrained in safety.

In particular it is known today the security system described in WO2012172198 that verify the presence of a passenger on a cableway installation chair and, in the positive case, if the safety bar is closed.

This system provides for projecting an infrared light beam towards the chair to analyze the shadow that the chair produces on a screen, when the chair is at a station for loading/unloading passengers.

An electronic device is programmed to distinguish the shadow produced by the chair occupied by at least one passenger from that of an empty chair and to distinguish the shadow produced by the chair with passenger with the bar closed from that of the chair with a passenger having the bar open.

This traditional security system is however complex, requiring a screen and an optical sensor that can read the shadow projected on the screen.

The screen, of course, must be near to a passing area of the chair thus can be damaged.

Moreover, this system is little reliable because of the difficulty to distinguish the images on the screen because of the variability in size and posture of the passengers.

In addition, this system does not allow continuous monitoring, along the cableway, thus resulting to be of limited effectiveness.

The problem underlying the present invention is therefore to increase the safety of a cableway installation.

Main aim of the present invention is to provide a security system for cableway installations, a method for enhancing the security of a cableway installation and a cableway installation provided with said system, which provides a solution to such a problem overcoming the above mentioned drawbacks.

Within this aim, it is an task of the present invention to propose a cableway installation that allows to monitor the safety of passengers with greater continuity.

Another task of the present invention is to provide a cableway installation that allows to promptly detect a disabled passenger retention system.

Another object of the invention is to propose a cableway installation which maintains high reliability for safety of the passengers, even in case of adverse weather conditions and/or in the event of fouling and/or degradation of the plant itself.

A further task of the present invention is to propose a safety system applicable to a pre-existing cableway installation and a method for enhancing the security of a pre-existing cableway installation that achieve the tasks indicated above.

This aim, these tasks and others which will become apparent hereinafter are achieved by a cableway installation, by a method for enhancing the security of a cableway installation and a security system for a cableway installation according to the enclosed independent claims.

Detail features of a cableway installation, of the method for enhancing the security of a cableway installation and of a security system for a cableway installation according to the invention are disclosed in the dependent claims.

Further features and advantages of the invention will become apparent from the description of a preferred, but not exclusive, embodiment of a cableway installation, of a method for enhancing the security of a cableway installation and of a security system for a cableway installation according to the invention, illustrated only by way of non-limitative example in the accompanying drawings, in which:

FIG. 1 shows a simplified sketch of a system according to the present invention;

Figure 2B:
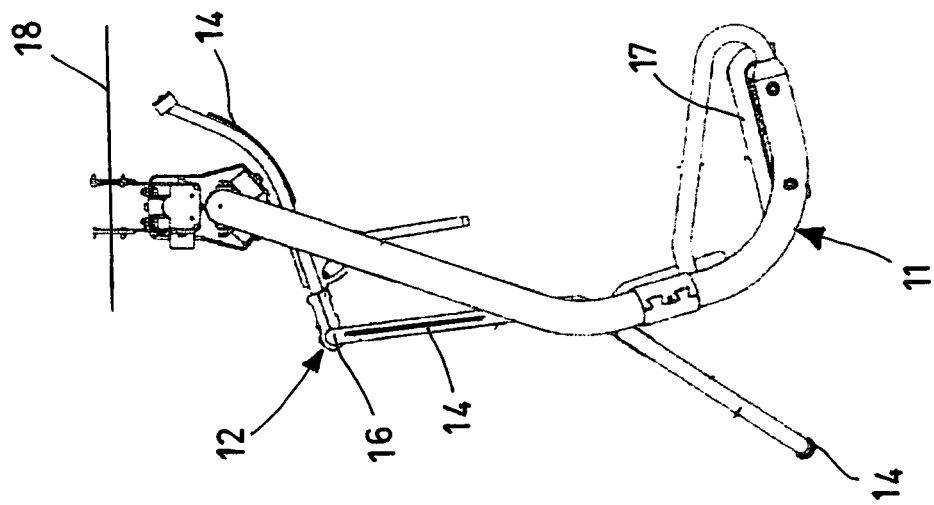
FIGS. 2a and 2b illustrate an example of a housing in an access and in a safety configurations.

With particular reference to the above figures, it is indicated with reference 10 a cableway installation comprising at least a housing 11 suitable for transporting passengers and equipped with a safety device 12 which is movable between an access configuration and a safety configuration.

The system 10, according to the present invention, has a particular characteristic in that it comprises:
radiation emitting means 13;
reflective means 14, adapted to reflect said radiation;
receiving means 15, adapted to receive a reflection of the radiation, emitted by reflective means 14.

The radiation emitting means 13, the reflecting means 14 and receiving means 15 according to the present invention are located in the plant 10 in such a way that, in at least one predefined operating condition, the radiation emitting means 13 are facing to the reflecting means 14, for irradiate them, and reflecting means 14 are facing the receiving means 15 to reflect thereto to said radiation.

Furthermore, the reflecting means 14 are fixed on the security device 12 so as to reflect said radiation differently depending on whether the safety device 12 is in the access configuration, or in the safety configuration.

It should be clear that, according to the present invention, the reflective means may be fixed to the safety device 12 in such positions as to be able to reflect said radiation towards the receiving means 15, only when the safety device is in the access configuration and in the safety configuration.

In other words, during the operation of the system 10, in the predefined operating condition, the reflecting means 14 are irradiated by the radiation emitting means 13, said radiation being reflected towards the receiving means 15, where the reflection pattern or the reflected image, when the safety device 12 is in the access configuration, differs from the reflection pattern or reflected image, when the safety device 12 is in the safety configuration.

In general, the access configuration of the safety device will be a configuration of the safety device in which the latter does not prevent or hinder access to the housing.

Wherein the safety configuration will be a configuration of the safety device in which the latter prevents the user from leaving the housing 11.

For example, in the embodiment of the plant 10 relative to a chairlift system, the security device may comprise a bar 16, and the housing may comprise a chair 17, possibly with multiple seats, with respect to which the bar 16 is hinged, in a per se conventional way, so that it is movable between a lowered position in which it prevents an user to leave the chair 17, to a raised position in which it allows a used to sit on the chair 17.

In this case the lowered position defines the safety configuration and the raised position defines the access configuration.

Figure 2A:
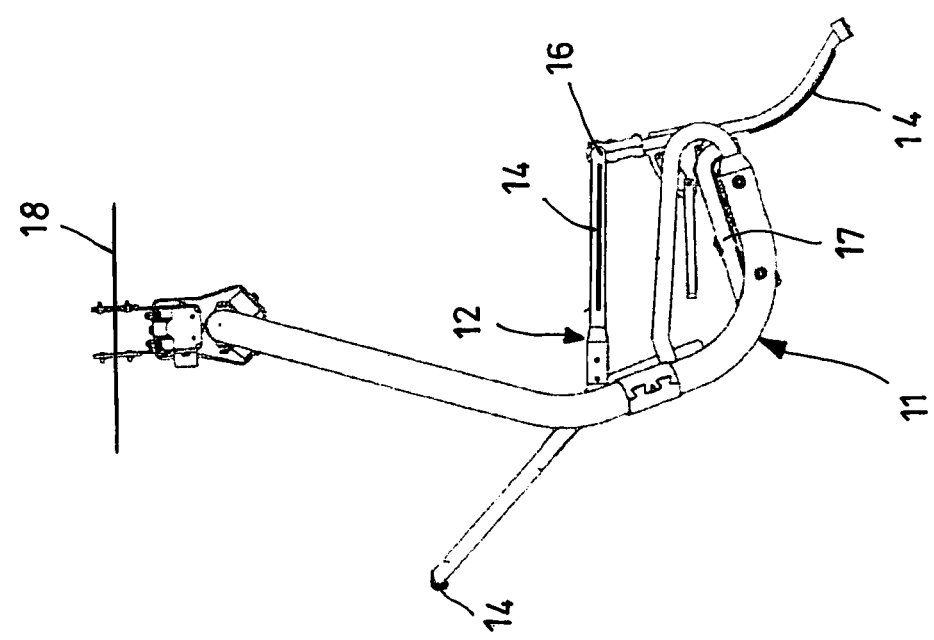

These configurations, in relation to the present embodiment, are represented by way of example and not exhaustive in the corresponding FIGS. 2*a* and 2*b*.

It is therefore clear that the present invention allows to detect if a housing 11 has the safety device 12 in the access configuration or in the safety configuration in a simple and fast way.

It is sufficient to analyze the data detected by the receiving means 15 that receive a first image or reflection pattern, in case the safety device is in the access configuration, and a second image configuration or reflection pattern, compared to the first, in the case of it is in the safety configuration.

It is clear that to obtain a continuous monitoring as much as possible of the configuration of the safety device 12, the system 10 will be configured so as to provide a plurality of said predefined operating condition, that is the system 10 will be advantageously configured in such a way that there are a plurality of positions, along its operation path, in which the radiation emitting means 13 are facing to the reflecting means 14, to irradiate, and in which the reflecting means 14 are facing to the receiving means 15 to reflect said radiation towards the latters In other words, during the movement of the housing 11, especially during the ascent along the installation path, the housing 11 will be in a plurality of positions in which the radiation emitting means 13 will be facing to the reflecting means 14 which will be facing the receiving means 15 so as to be able to detect, by means of the latter, the configuration of the safety device 12.

For example, in the case of a cableway installations of the type of chair lifts or gondola lifts, where the housings are constituted by chairs or cabins respectively.

In accordance with this example, the housings 18 are hung from a rope tow, which is supported by pillars 19 and driven between two stations 20.

In this case, the radiation emitting and receiving means 13, 15 will be preferably installed on the pylons 19 and/or in the stations 20 so as to irradiate the reflecting means fixed to the safety devices 12 of the housings 11 when they pass in close proximity to or in correspondence of the pylons 19 and/or the stations 20.

The reflecting means 14, to make particularly efficient detection of the configuration of the safety device 12, may be put on the latter in visible positions with respect to the advancement direction of the housing 11 and/or in locations visible from the side of the housing 11, as for example illustrated in FIGS. 2*a* and 2*b*.

To obtain a continuous monitoring it will be advantageously possible to install the radiation emitting and receiving means on each pylon 19 and 20 and in each station 20.

In accordance with the present invention, it is therefore possible to ascertain in a simple and fast way whether if the housings 11 are in safety, just by analyzing the signal received by the receiving means 15.

It will also be possible to implement in a simple way a monitoring localized in predefined portions of the system 10 only, or distributed throughout the entire system 10, in order to promptly detect dangerous conditions for users traveling in the housings 11.

Preferably, to avoid interference resulting from emission of light radiation in the visible range and for improved operation in conditions of limited visibility, for example in the presence of fog or clouds, said radiation comprise an infrared radiation.

For compactness and simplicity of installation, the radiation emitting means 13 and the receiving means 15 are preferably integrated in a single emitting-receiving device, such as in a video camera with integrated illuminator.

According to an embodiment which has proved to be particularly simple to manufacture, to use and to install, the reflecting means 14 advantageously comprise ribbons having a first face fixable to said safety device 12 and the second face adapted to reflect said radiation, such as a reflective band known per se.

To avoid that, in case of bad weather, the efficiency of the radiation emitting means 13 and/or of the receiving means 15 may be affected by the deposit thereon of snow and/or ice and/or moisture in the form of condensate, preferably the system 10 comprises heating means adapted for heating the radiation emitting means 13 and/or the receiving means 15 to remove from therefrom the snow/ice/moisture.

For example, these heating means can be realized by electrical resistors.

According to a further aspect of the present invention, intended to prevent or mitigate the harmful effect of weather on the efficiency of the radiation emitting means 13 and/or of the receiving means 15 they preferably consist in electronic devices configured so as to present a degree of protection of at least IP65 as defined by CEI EN 60529/1997.

It was verified that the fouling of the reflecting means can compromise the reliability of the detection of the safety device 12 configuration, in order to avoid this drawback, the system 10 preferably includes automatic cleaning means, passive or active, suitable to clean the reflecting means 14.

For example, such means may include cleaning brushes arranged for example at particular positions of the plant 10, such as for example in correspondence of the pylons 19 and preferably at the stations 20.

These brushes will be positioned, and possibly automatically activated, to interfere with the parts of the housings where the reflecting means 14 are applied on the safety device 12, so as to remove from the reflecting means 14 the dirt possibly accumulated thereon.

Advantageously, the system 10 includes a control device 21 connected to the receiving means 15 and configured to process an electronic signal received by the latter and to control the functionality of the system 10 in function of the electronic signal.

The control device 21 can be integrated with the receiving means 15, for example using a smart-camera, or it can be separated from the latter, which may include a plurality of cameras installed locally, for example on the same pylon, for example for complex analyzes.

In a further embodiment, the control device may be completely or partially arranged in a remote control station, the which the signal, or corresponding informations, would be transmitted by the aforementioned cameras.

Preferably, in this case the control device is distributed either locally, integrated with the receiving means, or remotely with respect to the latter. In this way it is possible to promptly provide the operator of the installation with updated informations on safety conditions of the system 10.

In a preffered embodiment of the present invention, the reflecting means comprise at least one reflective marker associated to a housing and capable of reflecting a signal representative of an identifier code of the housing itself, so as to allow to associate the safety detection to the specific unit that transports passengers.

To ensure the efficiency in use of the system 10, it is advantageously provided at least one sensor adapted to measure the reflection capacity of the reflecting means 14, to assess its efficiency.

Preferably, the sensor is connected to the control device 21 which is configured to process the signal coming from said sensor and providing information on the state of efficiency of the reflecting means.

For example it can be expected that the reference marker is not accessible to the user, and is placed in a position detectable by the IR sensor, less subject to wear/dirt, which is always identified.

In case such a position for the reference marker cannot be identified, it may be provided a cleaning mechanism that acts, at each passage on the boarding floor, on at least one marker that becomes a reference marker.

It forms part of the subject matter of the present also a security system for a cableway installation 10 that has a particular peculiarity in that it comprises:
  radiation emitting means 13;
  reflecting means 14, adapted to reflect said radiation, and which can be fixed to a safety device 12 of a housing 11 for the system 10 lift passengers;
  receiving means 15, adapted to receive a reflection of the radiation, emitted by reflective means 14;
  a control device 21 connected to the receiving means 15 and configured to process an electronic signal received by the latter; the control device 21 being connectable to the cableway installation 10 to control the functionality thereof in function of said electronic signal.

This safety system can be installed on an pre-existing cableway installation, obtaining the above described installation 10.

Another aspect of the present invention consists in a method for enhancing the security of a cableway installation that comprises at least a housing 11 suitable for transporting passengers and equipped with a safety device 12 which is movable between an access configuration and a safety configuration.

Said method, according to the present invention presents the particular peculiarity of comprising to install in a cableway installation provided with:
  radiation emitting means 13;
  reflective means 14 adapted to reflect said radiation;
  receiving means 15 adapted to receive a reflection of said radiation emitted by said reflecting means 14.

Wherein this method is to install on the cableway installation 10 the radiation emitting means 13, the reflecting means 14 and receiving means 15 in such a way that, in at least one predefined operating condition, the radiation emitting means 13 are facing to the reflecting means 14, for irradiate them, and reflecting means 14 are facing the receiving means 15 to reflect these to said radiation.

Furthermore, the method according to the present invention further provides to fix the reflecting means 14 to the safety device 12 so as to reflect the radiation differently depending on whether the safety device 12 is in said access configuration or in said safety configuration.

Such method allows to obtain a cableway installation 10 as described above, thus achieving the same aims and advantages said above.

In particular, to obtain at least a durable efficiency and reliability of the installation 10, the method according to the present invention preferably comprises a step of cleaning the radiation emitting means 13 and/or the receiving means 15 and/or the reflecting means 14 to maintain the efficiency.

The efficiency in time and the durability of the installation 10 is particularly safeguarded in the preferred case in which the method of the present invention advantageously comprises a step of measuring the index of reflection of the reflecting means 14, to verify their efficiency.

The invention thus conceived is susceptible to numerous modifications and variants, all falling within the scope of the appended claims.

Moreover, all the details may be replaced with other technically equivalent elements.

The materials employed, as well as the shapes and the dimensions, may be varied depending on the contingent requirements and state of the art.

Where the constructional characteristics and techniques mentioned in the following claims are followed by reference signs or numbers, such signs and reference numbers have been used with the sole purpose of enhancing the intelligibility of the claims and consequently they do not constitute in any way a limitation of the interpretation of each element identified, purely by way of example, by such signs and reference numbers.

The invention claimed is:

1. Cableway installation (10), comprising at least a housing (11) suitable to carry passengers and equipped with a safety device (12) which is movable between an access configuration and a safety configuration; said installation (10) being characterized by comprising:
  radiation emitting means (13) comprising an infrared radiation source that emits radiation;
  reflecting means (14), comprising a reflective band adapted to reflect said-radiation;
  receiving means (15), comprising a radiation-receiving device adapted to receive a reflection of said radiation emitted by said reflecting means (14);
wherein said radiation emitting means (13), said reflecting means (14) and said receiving means (15) are arranged in said cableway installation (10) in such a way that, in at least a predefined operating condition, said radiation emitting means (13) are facing said reflecting means (14) to irradiate them, and said reflecting means (14) are facing said receiving means (15) to reflect said radiation towards them;
said reflecting means (14) being fixed at least to said safety device (12) so as to reflect said radiation differently depending on whether said safety device (12) is in said access configuration or that is in said safety configuration.

2. Cableway installation (10) according to claim 1 characterized in that said radiation emitting means (13) and said receiving means (15) are integrated in a single emitting-receiving device.

3. Cableway installation (10) according to claim 1 characterized in that said reflecting means (14) comprising a reflective band comprises strips having a first face fixed to said safety device (12) and a second face adapted to reflect said radiation.

4. Cableway installation (10) according to claim 1 characterized in that it comprises heating means for heating said radiation emitting means (13) and/or said receiving means (15) to remove therefrom snow or ice or moisture.

5. Cableway installation (10) according to claim 1 characterized in that it comprises automatic means of cleaning, suitable to clean said reflecting means (14).

6. Cableway installation (10) according to claim 1 characterized in that it comprises a control device (21) connected to said receiving means (15) and configured to process an electronic signal received by said receiving means (15) and to control the functionality of said installation (10) in function of said electronic signal.

7. Cableway installation (10) according to claim 1 characterized in that it comprises at least one sensor for measuring the reflection capacity of said reflecting means (14), to assess its efficiency.

8. Security system for a cableway installation (10) characterized by comprising:
- radiation emitting means (13) comprising an infrared radiation source that emits radiation;
- reflecting means (14), comprising a reflective band adapted to reflect said radiation, and fixable to a safety device (12) of a housing (11) for passengers of said cableway installation (10);
- receiving means (15), comprising an emitting-receiving device adapted to receive a reflection of said radiation emitted by said reflecting means (14);
- a control device (21) connected to said receiving means (15) and configured to process an electronic signal received therefrom; said control device (21) being connectable to said cableway installation (10) to control the functionality thereof in function of said electronic signal.

9. Method for enhancing the safety of an cableway installation (10) which includes at least one housing (11) suitable to carry passengers and equipped with a safety device (12) which is movable between an access configuration and a safety configuration; said method being characterized by installing in said cableway installation (10):
- radiation emitting means (13) comprising an infrared radiation source that emits radiation;
- reflecting means (14) comprising a reflective band adapted to reflect said radiation;
- receiving means (15) comprising a radiation-receiving device adapted to receive a reflection of said radiation emitted by said reflecting means (14);
- said method providing for arranging in said cableway installation (10) the radiation emitter means (13), said reflecting means (14) and said receiving means (15) in such a way that, in at least a predefined operating condition, said radiation emitting means (13) are facing said reflecting means (14), to irradiate the latter, and said reflecting means (14) are facing said receiving means (15) to reflect towards the latter said radiation; said method comprising also fixing said reflecting means (14) to said safety device (12) so as to reflect said radiation differently depending on whether said safety device (12) is in said access configuration or in said safety configuration.

10. Method according to claim 9 characterized by comprising a step of cleaning said radiation emitting means (13) and/or said receiving means (15) and/or of said reflecting means (14) to maintain its efficiency.

11. Method according to claim 9 characterized in that it comprises a step of measuring the index of reflection of said reflecting means (14), to verify their efficiency.

* * * * *